United States Patent
Hanley et al.

(10) Patent No.: US 9,128,889 B2
(45) Date of Patent: Sep. 8, 2015

(54) SHARING INFORMATION ASSOCIATED WITH POWER GENERATION DEVICES VIA A FILE SYSTEM ON A NETWORK

(71) Applicant: General Electric Company, Schenectady, NY (US)

(72) Inventors: James Patrick Hanley, Atlanta, GA (US); Bradley Ree, Cumming, GA (US)

(73) Assignee: General Electric Company, Schenectady, NY (US)

(*) Notice: Subject to any disclaimer, the term of this patent is extended or adjusted under 35 U.S.C. 154(b) by 128 days.

(21) Appl. No.: 13/708,445

(22) Filed: Dec. 7, 2012

(65) Prior Publication Data

US 2014/0164570 A1 Jun. 12, 2014

(51) Int. Cl.
*G06F 15/16* (2006.01)
*G01D 4/00* (2006.01)

(52) U.S. Cl.
CPC ............... *G06F 15/16* (2013.01); *G01D 4/002* (2013.01); *Y02B 90/241* (2013.01); *Y02B 90/248* (2013.01); *Y04S 20/32* (2013.01); *Y04S 20/52* (2013.01)

(58) Field of Classification Search
USPC ............................... 709/219, 225; 705/13, 37
See application file for complete search history.

(56) References Cited

U.S. PATENT DOCUMENTS

| | | | |
|---|---|---|---|
| 8,468,244 B2* | 6/2013 | Redlich et al. | 709/225 |
| 2009/0254572 A1* | 10/2009 | Redlich et al. | 707/10 |
| 2010/0250497 A1* | 9/2010 | Redlich et al. | 707/661 |
| 2010/0332373 A1* | 12/2010 | Crabtree et al. | 705/37 |
| 2014/0164570 A1* | 6/2014 | Hanley et al. | 709/219 |
| 2014/0310075 A1* | 10/2014 | Ricci | 705/13 |
| 2015/0094968 A1* | 4/2015 | Jia et al. | 702/60 |

* cited by examiner

*Primary Examiner* — Tammy Nguyen
(74) *Attorney, Agent, or Firm* — Sutherland Asbill & Brennan LLP

(57) ABSTRACT

Certain embodiments herein are directed to transferring information between devices on a network using a filing system such as the WebDAV file system. In one embodiment, a sensor device may communicate with a computer server including a WebDAV file system to obtain information for various purposes, such as for software upgrades or resolution of software bugs. The computer server may receive data from a sensor associated with a home, business, or power generation equipment, or other asset. The computer server may further prepare the data for transmission to a filing system, which may include calling one or more WebDAV functions. The data may be used to determine additional data that may be used by the computer device that sent the data, in one embodiment. The data, as well as the additional data, may be stored in a WebDAV file system and/or transmitted to a remote computing device.

18 Claims, 3 Drawing Sheets

SHARING INFORMATION ASSOCIATED WITH POWER GENERATION DEVICES VIA A FILE SYSTEM ON A NETWORK

TECHNICAL FIELD

Embodiments of the disclosure relate generally to remote file access, and, more particularly, to sharing information associated with power generation devices via a file system on a network.

BACKGROUND OF THE DISCLOSURE

A sensor device, such as a smart meter or utility meter, may rely upon computer servers or other devices on a network for information to perform its functions. To store this information, the sensor devices may also rely upon vast amounts of memory at the sensor devices. Existing systems and methods may struggle both with transferring information to and from sensor devices and with storing information at sensor devices. For example, the transfer of information between computer servers and sensor devices may be secured by relatively costly, complex software and configurations that may slow the speed of file transfer and burden the deployment and administration of information sharing between sensors and computer servers. Other systems may rely upon large amounts of memory located at a sensor device for storing the information a sensor may need to perform its functions, which may also be relatively costly and slow to deploy.

BRIEF DESCRIPTION OF THE DISCLOSURE

Some or all of the above needs and/or problems may be addressed by certain embodiments of the disclosure. Certain embodiments may include systems and methods for sharing data between a sensor and a file system server, such as a WebDAV server. According to one embodiment, there is disclosed a system including a sensor configured to receive data and a network device configured to connect to a network. The system may also include at least one processor and at least one memory that stores computer-executable instructions. The processor may be configured to execute the computer-executable instructions in the memory to receive, from the sensor, data associated with an item, prepare the data associated with the item for interaction with a filing system, and send, via the network, the data associated with the item to the filing system.

According to another embodiment, there is disclosed a method for receiving, from a sensor, data associated with an item; preparing the data associated with the item for interaction with a filing system; and sending, with a network device, the data associated with the item to the filing system.

According to a further embodiment, there is disclosed a system including a sensor configured to receive data associated with at least one of a building, a residence, a business, a factory, a power plant, a turbine, a condenser, an automobile, or an asset of at least one of a residence, a business, a factory, an automobile, or a power plant. The system may also include a network device configured to connect to a network. The system may further include at least one processor and at least one memory that stores computer-executable instructions. The processor may be configured to execute the computer-executable instructions in the memory to receive, from the sensor, data associated with at least one device, prepare the data for interaction with a filing system, store the data in the filing system, and provide, via the network, information associated with the filing system to a computing device.

BRIEF DESCRIPTION OF THE FIGURES

The detailed description is set forth with reference to the accompanying drawings, which are not necessarily drawn to scale. The use of the same reference numbers in different figures indicates similar or identical items, in accordance with an embodiment of the disclosure.

DETAILED DESCRIPTION OF THE DISCLOSURE

Figure 1:
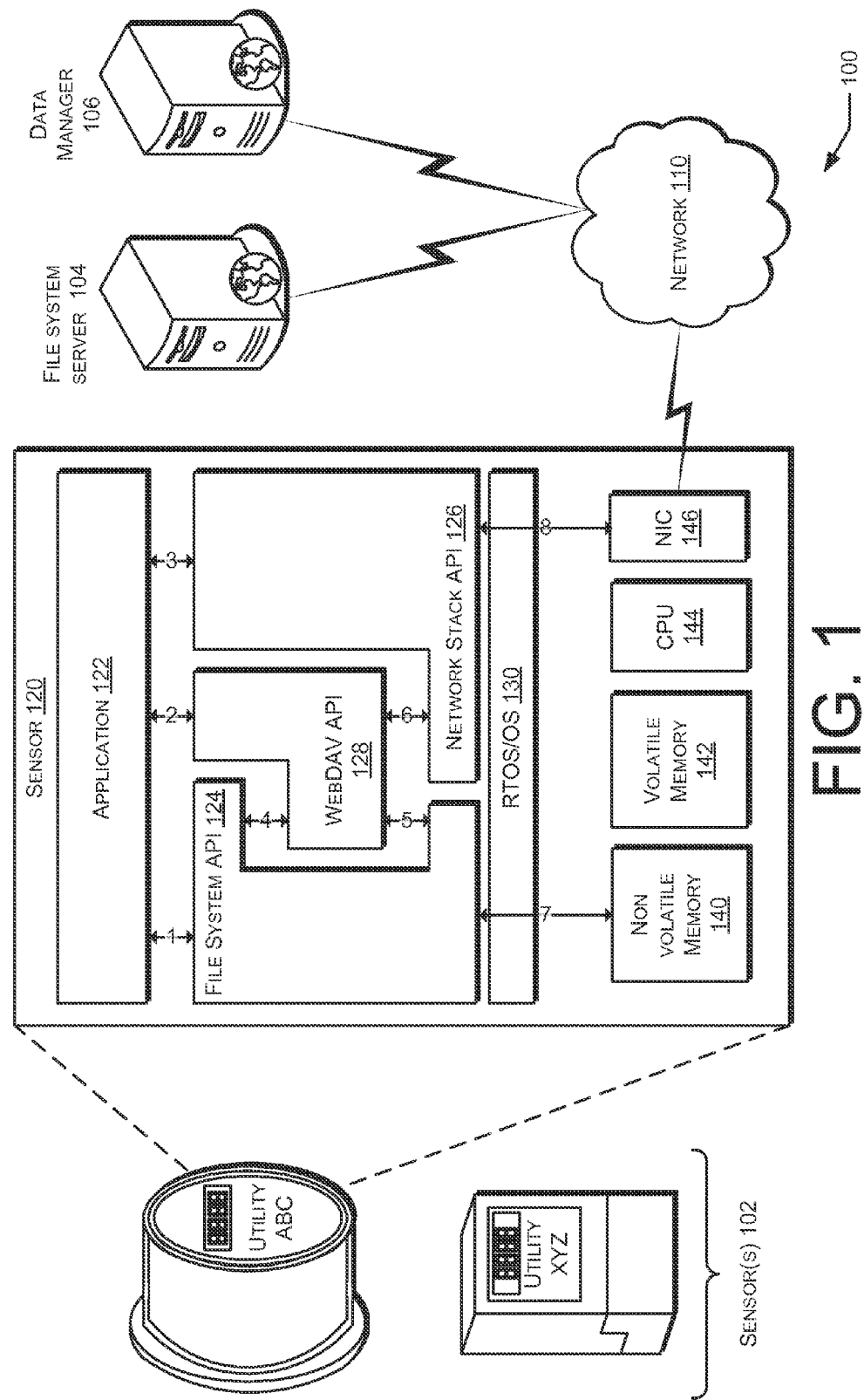
FIG. 1 is a block diagram of an exemplary computing environment including a file system server and a sensor with various software and hardware components that enable communication with a filing system, in accordance with one embodiment of the disclosure.

Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Illustrative embodiments of the disclosure are directed to, among other things, storing and retrieving information over a network using a file system, such as a web distributed authoring and versioning (WebDAV) file system. Information stored in a WebDAV-type file system may be accessed and/or updated via a WebDAV-type protocol. According to certain embodiments herein, a WebDAV file system may reside on a file system server on a network while the WebDAV protocol may be located on a sensor. Such a configuration may therefore allow the sensor to communicate with the WebDAV file system to retrieve information from and store information in the WebDAV file system. The information stored in the WebDAV file system may be measurements performed by the sensor, traces or other results associated with debugging software that may not be operating properly on the sensor, information associated with upgrading the firmware or libraries in the sensor, or system or activity logs including information associated with the performance of the sensor, as non-limited examples.

As an example, to upgrade the current firmware version of a sensor, a file system server that may initiate the upgrade may require certain information from the sensor. The sensor, via the WebDAV protocol, may send the information to the WebDAV file system stored at the file system server. Upon obtaining the information, the file system server may identify information that may be needed to perform the upgrade of the sensor and store the information in the WebDAV file system. The sensor may retrieve the identified information to a memory at the sensor and use it to perform the upgrade. Other examples in addition to upgrading the sensor's software or firmware may exist in other embodiments. These examples may involve a filing system other than a WebDAV file system. Additional configurations may also exist in other embodiments. For example, a sensor may include a filing system, such as a WebDAV file system, whereas the file system server may include the WebDAV protocol, thereby enabling the file system server to access and/or update files stored in the WebDAV file system at the sensor.

The technical effects of certain embodiments herein may include, but are not limited to, cost effective utilization of sensors, including sensors associated with power generation equipment. For example, sensors may be upgraded and/or receive information for their operation without purchasing additional memory for the sensors. Additionally, information may be transferred between a sensor and a file system server or other devices securely without adding relatively complex encryption-based software that may slow the transfer of information as well as the time to deploy sensors configured to support such information transfer.

FIG. 1 depicts a block diagram of an exemplary computing environment for sharing information between a sensor and a file system server via a WebDAV file system, according to one embodiment. The computing environment 100 may include, but is not limited to, sensors 102, a file system server 104, and a data manager 106, each of which may communicate with each other via any number of wired and/or wireless networks 110, including the Internet. In other embodiments, other networks, intranets, or combinations of networks may be used. Other embodiments may not involve a network but may, for example, describe devices that are directly connected to one another, e.g., the file system server 104 may be directly connected to the data manager 106.

As used herein, the term "device" may refer to any processor-based device capable of executing computer-executable instructions to perform the functions described in embodiments herein. Example of computing devices may include a sensor, a computer server, a mainframe, a web server, a personal computer, a mobile device, etc.

As described herein, a sensor 102 may measure a physical quantity and convert it into a signal. The converted signal may be analyzed and/or processed to determine consumption, a condition, or other information associated with an item. Thus, a sensor may measure data associated with an item. Example items may include, but are not limited to, a building, a residence, a business, a factory, an automobile, a power plant, a turbine, a condenser, or other power generation equipment assets. Examples of the sensor 102 may include, but are not limited to, a power consumption meter, a smart meter, an International Electrotechnical Commission (IEC) meter, an electricity meter, a gas meter, a water meter, a district heating meter, a remote monitoring sensor, an actuator, or various other measurement meters or devices. FIG. 1 illustrates two sensors 102. Fewer or more numbers and/or types of sensors 102 may exist in other embodiments.

The sensor 102 may be configured to receive data stored in a file system located on a network device configured to connect to a network, such as a file system server 104. Such a configuration may include hardware devices, such as a non-volatile memory 140, a volatile memory 142, a processor 144, and a network interface card (NIC) 146, among other devices in other configurations. The sensor 102 may also include an operating system (OS) 130 and application programming interfaces (APIs), such as a file system API 124, a network stack API 126, and a WebDAV API 128, as well as other software in other configurations.

The processor 144 may be implemented as appropriate in hardware, software, firmware, or combinations thereof. Software or firmware implementations of the processor 144 may include computer-executable or machine-executable instructions written in any suitable programming language to perform the various functions described.

The non-volatile memory 140 may store file systems and program instructions that are loadable and executable on the processor 144, as well as data generated during the execution of these programs. Examples of the non-volatile memory 140 may include read-only memory (ROM), flash memory, etc. In one embodiment, the non-volatile memory 140 may store firmware and/or configuration files for controlling the behavior of the firmware. The configuration files and/or information in the configuration files may be shared between the sensor 102 and the file system server 104 to facilitate an upgrade of the sensor 102, in one embodiment. According to one configuration, one or more of the application 122, program modules 124, 126, 128, and the operating system 130 may be loaded in the non-volatile memory 140.

The operating system (OS) 130 may be the Real-Time Operating System (RTOS) in one embodiment. An RTOS operating system may serve real-time application requests, such as those that may be received from the application 122, as will be described in greater detail below.

The volatile memory 142 may store file systems, program instructions, and data associated with the program instructions. The volatile memory 142 may also store temporary files or other less permanent information located at a sensor 102 or other device. In one embodiment, the volatile memory 142 may include random access memory (RAM) or dynamic random access memory (DRAM), as non-limited examples. Other embodiments may involve various other types of memory.

The application 122 may perform various functions for the sensor 102, such as upgrading the sensor 102, applying software patches to address performance issues associated with the sensor 102, or other functions that may rely on information stored in a filing system such as the WebDAV file system. According to an example configuration, the application 122 may communicate with a file system API 124 (as indicated by double arrow 1) to access information stored in the non-volatile memory 140. In one aspect, the file system API 124 may communicate with a file system driver interface in the RTOS OS 130 to allow the application 122 to access a file system or other data structure in the non-volatile memory 140 (as indicated by double arrow 7). The application 122 may also communicate with a network stack API 126 (as indicated by double arrow 3) to establish a socket connection between the sensor 102 and other devices, such as the file system server 104. The network stack API 126 may include one or more socket libraries accessible at the application level to enable the application 122 to establish such a connection.

In one embodiment, the WebDAV API 128 may interface with the application 122, the file system API 124, and the network stack API 126 to enable these modules to communicate with a WebDAV file system. For example, the application 122 may call functions in the WebDAV API 128 (as indicated by double arrow 2) to directly access a WebDAV file system. As another example, the file system API 124 may include a driver interface for communicating with the WebDAV API 128 to access a WebDAV file system (as indicated by double arrow 4). In one embodiment, the file system API 124 may determine that the type of file being accessed is a WebDAV file and may subsequently call the appropriate WebDAV API 128 function to access the file, either locally at the sensor 102 (as indicated by the double arrow 5) or on a network (as indicated by double arrow 6). To access a file stored in a WebDAV file system on a network, the WebDAV API 128 may call one or more functions in the network stack API 126 to establish a connection over the network to a file system server 104 storing the WebDAV file system, for example, to enable the sensor's 102 access to the desired file in the Web- DAV file system. A network driver in the network stack API 126 may configure a network interface card (NIC) 146 (as indicated by double arrow 8) to connect the sensor 102 to a WebDAV file system stored at the file system server 104 over a network 110 (as indicated by double arrow 9), in one embodiment.

As described above, the file system server 104 may store a filing system. In one embodiment, the file system server 104, or another computing device storing the filing system, may be located remotely from a sensor 102. In one aspect of the embodiment, the computing device may include a WebDAV server that provides WebDAV functionality to the sensor 102 via the network. The computing device, e.g., the file system server 104, may provide, via the network, information associated with the filing system to another computing device, in one embodiment.

According to certain embodiments, the file system server 104 may retrieve information from the data manager 106 and store it in the WebDAV file system, where it may be accessed by the sensor 102, or other devices connected to the network 110. The file system server 104 may identify information associated with a sensor 102 and store the information in a file for access by the sensor 102. In one embodiment, the file system server 104 may store information for multiple sensors in a respective directory such that each sensor may retrieve information relevant to the sensor. The stored information may include information that may be used to configure the operation of the sensor, error and/or activity logs associated with the sensor activities, operational data associated with a sensor's operation, or other information that may indicate the status or performance of a sensor.

In one example, such information may be used by the file system server 104 to determine whether a sensor 102 should be upgraded and, if so, what version of software to install at the sensor. As another example, operational data may be used by the file system server 104 to debug software that may not be operating properly in a sensor 102. The file system server 104 may use results from the debugging to determine a software patch to repair the sensor 102. As will be discussed in greater detail below, the file system server 104 may include one or more software modules to provide such functionality.

In some embodiments, the WebDAV file system and various information related to the sensors 102 may be stored in a data manager 106. The data manager 106 may be configured to allow access from the file system server 104 and various other devices via the network 110, according to one embodiment. In another embodiment, the information stored by the data manager 106 may be stored by the file system server 104.

In other embodiments, the WebDAV file system described above may be stored on a sensor 102 while the file system server 104 may include software and/or program modules similar to those described above on the sensor 102 that may be used to retrieve and/or store information in the WebDAV file system located at a sensor 102.

Figure 2:
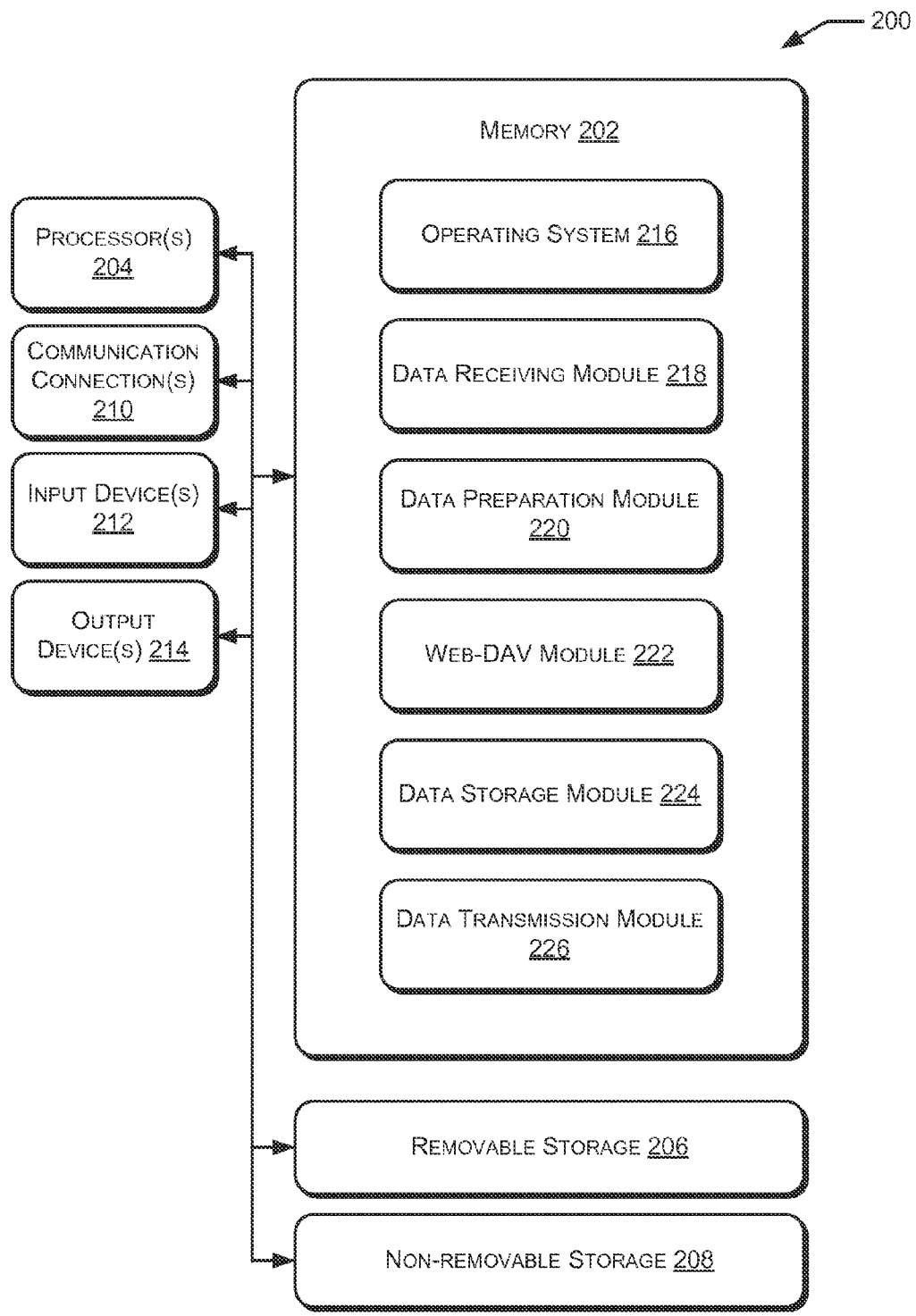
FIG. 2 is an exemplary computing environment that shares data between a sensor and a file system server via a filing system, in accordance with one embodiment of the disclosure.

FIG. 2 depicts an exemplary computing environment for transferring information between a sensor and a computer server storing a WebDAV file system, according to one embodiment. The computing environment 200 may include a computing device, such as the file system server 104 in FIG. 1, that may include a processor 204 capable of communicating with a memory 202. In one embodiment, the processor 204 may be similar to the processor 144 described in FIG. 1.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). In one embodiment, the memory 202 may be similar to the memory 140 or 142 described in FIG. 1.

The computer device may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tapes, magnetic disk storage or other magnetic storage devices, or any other medium which can be used to store the desired information and which can be accessed by the computer device. Combinations of any of the above should also be included within the scope of computer-readable media.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

The computing environment 200 may also contain one or more communication connections 210 that allow the computer device to communicate with other devices, such as a sensor or other equipment associated with power generation, as non-limiting examples. The communication connections 210 may be established via a wired and/or wireless connection between a computer device and an asset. The connection may involve a network such as the Internet or may be a direct connection (i.e., excluding a network) between the computer device and the equipment, according to various embodiments. The computing environment 200 may also include one or more input devices 212, such as a keyboard, mouse, pen, voice input device, and touch input device. It may also include one or more output devices 214, such as a display, printer, and speakers.

Turning to the contents of the memory 202 in more detail, the memory 202 may include an operating system 216 and one or more application programs or services for implementing the features and aspects described herein, including a data receiving module 218, a data preparation module 220, a WebDAV module 222, a data storage module 224, and a data transmission module 226. In one embodiment, the devices and application programs shown in FIG. 2 may be associated with a computer server, such as the file system server 104.

The data receiving module 218 may receive information, such as information from a sensor 102 in FIG. 1. Examples of information that may be received include data associated with an item, such as a building, a residence, a business, a factory, another facility, an automobile, or a power generation asset such as a turbine, a condenser, or a power plant. The data may include measurements associated with the consumption of a utility at a residence or building, or other information that may be sensed or collected by a sensor coupled to an item, in one embodiment.

A data preparation module 220 may prepare data, such as the data received from a sensor associated with an item, for interaction with a filing system. In one aspect of an embodiment, the filing system may include a computing device that may be located at a remote location from the sensor. To prepare data, the data preparation module 220 may call at least one WebDAV method with the data to, for example, copy data to a WebDAV file system, delete data from a WebDAV file system, or protect data in a WebDAV file system by locking a file associated with the data, as non-limiting examples.

In some embodiments, the data preparation module 220 may identify additional information to store in a file system along with received data. For example, the data preparation module 220 may access a database, e.g., the data manager 106, to identify information associated with the received data. In one example, the identified information may be stored in a directory associated with a sensor, where the sensor may access the information and use it to perform various functions, such as upgrading the sensor's operating system or repairing a failing portion of a software module running in a sensor.

The data storage module 224 may store information in a filing system, such as a WebDAV file system. As described, the data storage module 224 may store the information in a directory or subdirectory associated with a sensor from which the information was received. In one embodiment, the directory structure of a WebDAV file system may be mirrored on a sensor such that when the sensor sends information to the WebDAV file system, a reference to a directory for storing the information on the WebDAV file system may be provided. The data storage module 224 may store the information in the directory indicated by the reference, in one embodiment.

A data transmission module 226 may transmit information to a device located remotely from a filing system, such as a WebDAV file system. For example, upon determining, e.g., by the data preparation module 220, that certain information is required to upgrade a sensor, the data transmission module 226 may transmit the information to the sensor, where an application, e.g., application 122 in FIG. 1, may use the information to upgrade the sensor.

The WebDAV module 222 may include an API, such as the WebDAV API 128 associated with the sensor 102 in FIG. 1. The WebDAV module 222 may, therefore, enable a computing device, such as the file system server 104, to access information and/or send information to a WebDAV file system stored on a remote device, such as the sensor 102 or the data manager 106, according to various embodiments.

Figure 3:
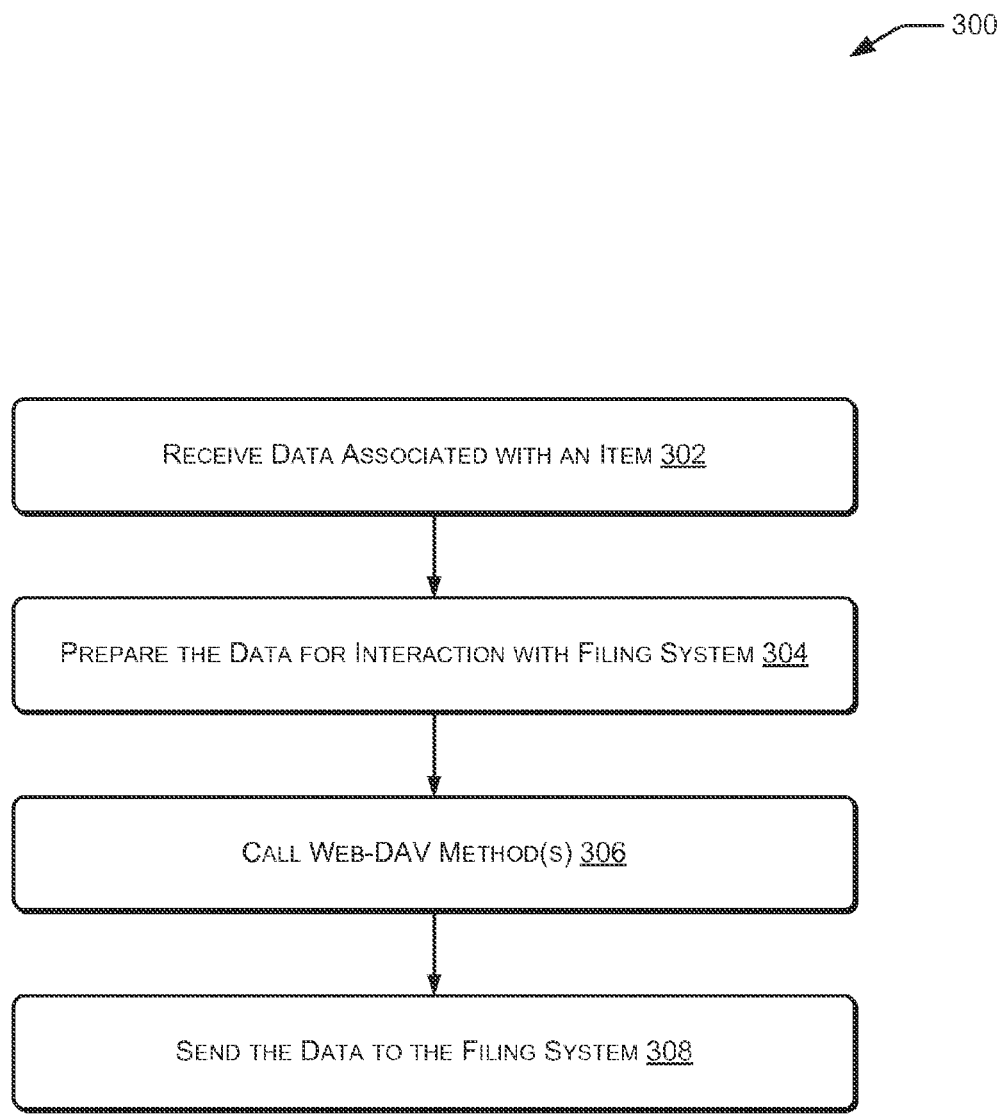
FIG. 3 is a flow diagram illustrating details of a method for using a filing system to share data between a sensor and a file system server, in accordance with one embodiment of the disclosure.

FIG. 3 is an example flow diagram 300 illustrating details of a method for using a filing system to share data between a sensor and a file system server, in accordance with one embodiment of the disclosure. In one embodiment, such data sharing may involve a sensor 102 and a file system server 104, as shown in FIG. 1. The process 300 is illustrated as a logical flow diagram, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302, where data associated with an item may be received, e.g., by the data receiving module 218. The data may be prepared for interaction with a filing system, such as a WebDAV file system, at block 304. As described, such preparation may include calling one or more WebDAV methods associated with the information. One such function may include storing the information, e.g., via the data storage module 224. Numerous other methods may be called, such as those associated with establishing a network connection between devices on a network, copying information to a file system, and/or deleting a file from a file system, as non-limiting examples. The WebDAV methods may be called, at block 306.

Information may be sent to a WebDAV file system, e.g., via the data transmission module 226, at block 308. In one example, a computing device such as the file system server 104 or the sensor 102 may transmit information, e.g., via a data transmission module 226, to a remote device such as a data manager 106 that may store a WebDAV file system. According to various embodiments, any of the sensor 102, the file system server 104, or the data manager 106 may include a filing system, e.g., a WebDAV file system, while at least one of the other devices may include the WebDAV protocol to configure the devices to act as a WebDAV file system client that may share files with the computing device storing the filing system. Numerous other configurations and examples may exist in other embodiments.

Illustrative systems and methods for transmitting information between a sensor and another computing device on a network are described above. Some or all of these systems and methods may, but need not, be implemented at least partially by configurations such as those described in FIGS. 1 and 2. It should be understood that certain acts in the methods may be rearranged, modified, and/or omitted entirely, depending on the circumstances. Also, any of the acts described above with respect to any method may be implemented by any number of processors or other computing devices based on instructions stored on one or more computer-readable storage media.

That which is claimed:

1. A system, comprising: a sensor comprising a meter, the sensor configured to receive measure data associated with an item coupled to the meter; a network device configured to connect to a network; at least one memory that stores computer-executable instructions; at least one processor configured to access the at least one memory, wherein the at least one processor is configured to execute the computer-executable instructions to: receive, from the sensor, the data associated with the item; prepare the data associated with the item for interaction with a filing system, wherein the computer-executable instructions to prepare the data further configure the at least one processor to send, via the network device to the filing system, the data and a reference to a location in the filing system for storing the data in association with the sensor; receive, from the filing system in response to sending the data and the reference, information associated with operation of the sensor; and send the information to the sensor, wherein the sensor loads the information to update the operation of the sensor.

2. The system of claim 1, wherein the sensor comprises at least one of a power consumption meter, a smart meter, an International Electrotechnical Commission (IEC) meter, an electricity meter, a gas meter, a water meter, a district heating meter, a remote monitoring sensor, or an actuator.

3. The system of claim 1, wherein the item comprises at least one of a building, a residence, a business, a factory, a power plant, a turbine, a condenser, an automobile, or an asset of at least one of a residence, a business, a factory, an automobile, or a power plant.

4. The system of claim 1, wherein the filing system comprises a computing device remote from the sensor.

5. The system of claim 1, wherein the computing device comprises a Web-based Distributed Authoring and Versioning (WebDAV) server.

6. The system of claim 1, wherein the WebDAV server provides WebDAV functionality to the sensor via the network.

7. The system of claim 1, wherein the preparation of the data associated with the item for interaction with a filing system comprises calling at least one Web-based Distributed Authoring and Versioning (WebDAV) method with the data.

8. A method, comprising: receiving, by at least one processor from a sensor comprising a meter, data associated with an item coupled to the meter; preparing, by the at least one processor, the data associated with the item for interaction with a filing system wherein preparing the data further comprises sending, via a network device to the filing system, the data and a reference to a location in the filing system for storing the data in association with the sensor; receiving, by the at least one processor in response to sending the data and the reference, information associated with operation of the sensor; and sending, by the at least one processor, the information to the sensor, the information for updating the operation of the sensor.

9. The method of claim 8, wherein the sensor comprises at least one of a power consumption meter, a smart meter, an International Electrotechnical Commission (IEC) meter, an electricity meter, a gas meter, a water meter, or a remote monitoring sensor.

10. The method of claim 8, wherein the item comprises at least one of a building, a residence, a business, a factory, a power plant, a turbine, a condenser, an automobile, or an asset of at least one of a residence, a business, a factory, an automobile, or a power plant.

11. The method of claim 8, wherein the filing system comprises a computing device remote from the sensor.

12. The method of claim 11, wherein the computing device comprises a Web-based Distributed Authoring and Versioning (WebDAV) server.

13. The method of claim 12, wherein the WebDAV server provides WebDAV functionality to the sensor via the network.

14. The method of claim 13, wherein preparing the data associated with the item for interaction with a filing system comprises calling at least one Web-based Distributed Authoring and Versioning (WebDAV) method with the data.

15. A system, comprising:
- a sensor comprising a meter, the sensor configured to measure data associated with at least one of a building or a power generation asset;
- a network device configured to connect to a network;
- at least one memory that stores computer-executable instructions;
- at least one processor configured to access the at least one memory, wherein the at least one processor is configured to execute the computer-executable instructions to:
    - receive, from the sensor over the network, data and a reference to a location in a filing system for storing the data;
    - prepare the data for interaction with a filing system, wherein the computer-executable instructions to prepare the data further configure the at least one processor to store the data in the location of the filing system;
    - determine, based at least in part on the received data, information for updating operation of the sensor; and
    - send, to the sensor via the network, the information to the sensor, wherein the sensor loads the information to update the operation of the sensor.

16. The system of claim 15, wherein the at least one memory is configured to store the filing system locally.

17. The system of claim 15, wherein the filing system comprises a Web-based Distributed Authoring and Versioning (WebDAV) system.

18. The system of claim 15, wherein the preparation of the data for interaction with a filing system comprises calling at least one Web-based Distributed Authoring and Versioning (WebDAV) method with the data.

* * * * *